(No Model.)
A. COX.
STRADDLE ROW WHEEL CULTIVATOR.
No. 341,889. Patented May 18, 1886.
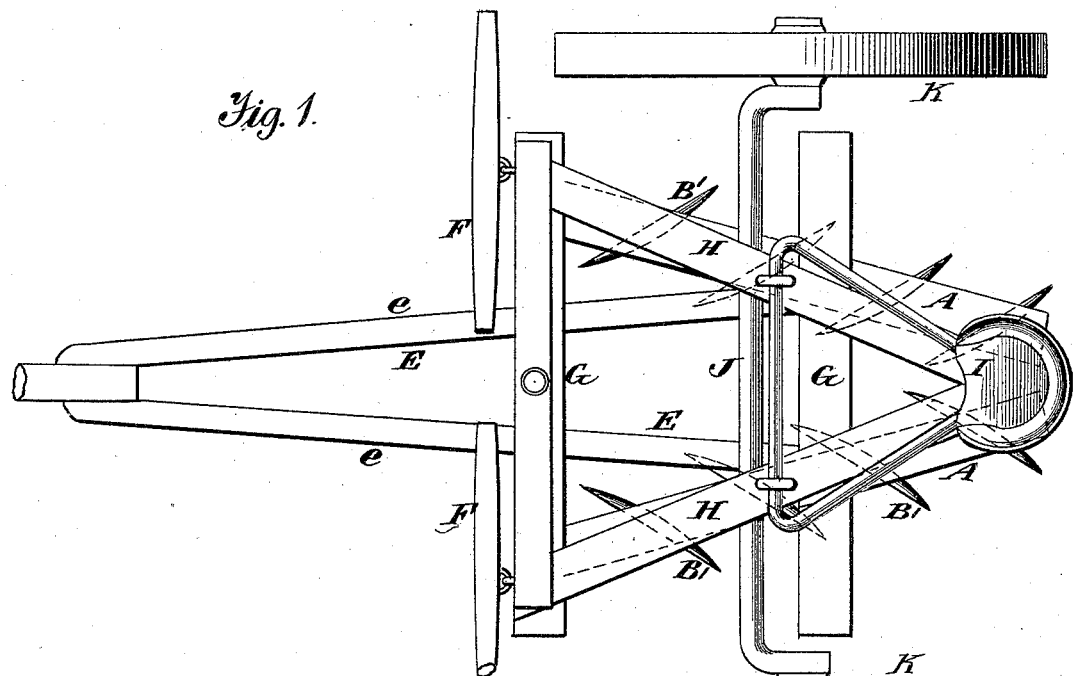
Witnesses.
A. Ruppert.
Alfred T. Gage.
Inventor:
Alfred Cox,
Per
Thomas P. Simpson,
atty.

UNITED STATES PATENT OFFICE.

ALFRED COX, OF JULIUSTOWN, NEW JERSEY.

STRADDLE-ROW WHEEL-CULTIVATOR.

SPECIFICATION forming part of Letters Patent No. 341,889, dated May 18, 1886.

Application filed September 17, 1885. Serial No. 177,329. (No model.)

*To all whom it may concern:*

Be it known that I, ALFRED COX, a citizen of the United States, residing at Juliustown, in the county of Burlington and State of New Jersey, have invented certain new and useful Improvements in Straddle-Row Wheel Plows or Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to wheel, sulky, and disk plows or cultivators which straddle rows of plants so as to turn the dirt to or from them.

My special object is to construct one which shall serve two purposes—namely, to plow or cultivate corn, and also to bury or cover up the stubs.

Figure 1 of the drawings is an elevation in perspective, showing my combined stub-cutter and plow or cultivator. Fig. 2 is a side elevation showing the local relation of the angle-frame, pillow-blocks, and other portions of the frame. Figs. 3 and 4 are plan views of the relative position of the cutters to the angle-frame and to one another when the implement is to be used as a stub-cutter.

In the drawings, A A represent two independent beams, on which are supported the standards B of the disk-plows B'. These beams are inclined to one another, as shown in Figs. 3 and 4 of the drawings, so as to form an acute angle, while the plows B' are arranged obliquely to the line of draft, so as to cut the lateral roots of the stubs, and then turn under the stubs themselves. This places the soil of the corn-field in fine tilth to receive grain, buries beyond reach of the drill all stubs, and leaves the field smooth and level for subsequently cutting grain and grass.

As the implement straddles the row of stubs, the farthest-off furrow on each side is first turned, the next pair of plows come one furrow nearer on each side, and this gradual approach continues until the rearmost plows turn the stubs completely under the ground.

The plow-beams are bolted detachably to to the bottom of the pillow-blocks C D, which are four in number, and on which the beams A A may be adjusted so as to come together very near at their front or rear ends, according to the direction in which the soil is to be thrown to or from the plants.

If it is intended to cultivate young corn, the approximating ends of the beams are set farther apart than where it is intended to cut up the stubs and turn them under.

If it is desired to turn the soil toward the rows, the beams A A are adjusted on the pillow-blocks so as to make them converge toward the front, as shown in dotted lines of Fig. 3 of the drawings. In this case the first furrows turned will be nearest the plants and the last farthest off therefrom.

E is a V-shaped pole formed of two bars, e e, detachably and adjustably bolted to the inner ends of the pillow-blocks. On each side of the pole are arranged the usual single-trees, F F. By vertically adjusting the bars e e on the pillow-blocks D D the pole may be raised so as to elevate the front end of machine to adapt it to the work intended.

G G are cross-bars, which connect the pillow-blocks, and on which the top frame, H, is secured so as the support the driver's seat I at the rear.

The axle J, which carries the ground-wheels K K, is cranked in a well-known way, so that the machine may be moved up or down, thus adjusting and giving regularity to the depth of all the plows, as well as ease in turning and moving.

Having thus described all that is necessary to a full understanding of my invention, what I claim as new, and desire to secure by Letters Patent, is—

1. A straddle-row plow whose two beams, A A, converge and meet, or nearly so, at the rear ends, bringing the disks in the local relation shown, whereby the roots of corn-stubs may be first cut on each side thereof, and then the stubs turned down in the manner described.

2. The independent adjustable beams A A, carrying standards and disks B B', the pillow-blocks C D, the adjustable pole E, and the cross-bars G G, in combination with an axle and wheels, as and for the purpose set forth.

In testimony whereof I affix my signature in presence of two witnesses.

ALFRED COX.

Witnesses:
WALTER L. WRIGHT,
BENJAMIN B. ANTRIM.